US012761893B2

(12) United States Patent
Zhang et al.

(10) Patent No.: US 12,761,893 B2
(45) Date of Patent: Oct. 13, 2026

(54) SINGLE NODE ROLLING ONLINE PATCHING OF A DATABASE SERVER

(71) Applicant: Oracle International Corporation, Redwood Shores, CA (US)

(72) Inventors: Ying Zhang, Gilroy, CA (US); Andrey Gusev, Dublin, CA (US); Jonathan Creighton, Oakland, CA (US); Siu Tam, Redwood City, CA (US); Balaji Pagadala, San Jose, CA (US)

(73) Assignee: Oracle International Corporation, Redwood Shores (CA)

( * ) Notice: Subject to any disclaimer, the term of this patent is extended or adjusted under 35 U.S.C. 154(b) by 393 days.

(21) Appl. No.: 18/379,627

(22) Filed: Oct. 12, 2023

(65) Prior Publication Data

US 2024/0126531 A1 Apr. 18, 2024

Related U.S. Application Data

(60) Provisional application No. 63/416,460, filed on Oct. 14, 2022.

(51) Int. Cl.
*G06F 8/65* (2018.01)

(52) U.S. Cl.
CPC .................................... *G06F 8/65* (2013.01)

(58) Field of Classification Search
CPC .................................... G06F 8/61; G06F 8/65
See application file for complete search history.

(56) References Cited

U.S. PATENT DOCUMENTS

| | | | | |
|---|---|---|---|---|
| 9,229,707 | B2 * | 1/2016 | Borissov | G06F 8/656 |
| 11,449,330 | B2 * | 9/2022 | Islam | G06F 8/658 |
| 11,579,864 | B1 * | 2/2023 | Ranger | G06F 8/65 |
| 2014/0376362 | A1 * | 12/2014 | Selvaraj | H04L 41/082 370/221 |
| 2018/0373521 | A1 * | 12/2018 | Huang | H04L 67/34 |
| 2019/0102384 | A1 * | 4/2019 | Hung | G06F 9/4843 |
| 2023/0229477 | A1 * | 7/2023 | Lin | H04W 24/02 718/1 |

* cited by examiner

*Primary Examiner* — Marina Lee
(74) *Attorney, Agent, or Firm* — Vista IP Law Group, LLP

(57) ABSTRACT

Described are improved systems, computer program products, and methods for a new local rolling online patching solution to a database server with minimized disruption to other instances during patching. For a one-node database server, it achieves single rolling online patching by starting a new instance of the same database from the newly patched home before shutting down the collocated instance running out of the old home.

25 Claims, 12 Drawing Sheets

SINGLE NODE ROLLING ONLINE PATCHING OF A DATABASE SERVER

CROSS REFERENCE TO RELATED APPLICATIONS

The present application claims the benefit of priority to U.S. Provisional Application 63/416,460, filed Oct. 14, 2022, and titled SINGLE NODE ROLLING ONLINE PATCHING OF A DATABASE SERVER, which is hereby incorporated by reference in its entirety.

BACKGROUND

Ensuring that a software application is running with the latest updates and patches is important for many types of software, particularly for enterprise class software that are running mission-critical applications. In many cases, there is often the need to implement frequent patching operations in a way that allows for minimal potential downtime for end users.

A rolling upgrade is a technique to implement software updates, upgrades, and patches, where the individual members of a system are permitted to stay running, while other members may be updated.

Rolling upgrades are very useful in numerous types of computing architectures. For example, rolling upgrades may be used in a database context. An example database context in which rolling upgrades may be usefully employed in the context of a "cluster". A database cluster is a type of system that allows the underlying servers within the computing infrastructure to communicate with each other so that they appear to function as a collective unit. Although the servers may be configured as standalone servers, each server has additional processes that communicate with other servers and where the different servers may access a shared/common set of database storage objects. The clustered database system therefore contains a shared architecture in which multiple running instances can each be used to manage a set of shared physical data files.

The typical cluster arrangement includes multiple nodes, where the multiple nodes form the membership of the cluster. In the multi-node cluster arrangement, classic rolling upgrade techniques may be applied to implement updates and patches, since a first node can stay up and running while a second node is being patched.

The issue addressed by the current disclosure is the context of a single node cluster. There is no existing solution to perform online patching with a single node cluster, since current solutions would require the shutting down of the database instance on the single node, making the database completely unavailable before the database service is restarted from the newly patched database.

Therefore, there is a need for an improved approach to address the above-described problem.

SUMMARY

Some embodiments of the invention provide a new local rolling online patching solution to a database server with minimized disruption to other instances during patching. For a one-node database server, this approach achieves single rolling online patching by starting a new instance of the same database from the newly patched home before shutting down the collocated instance running out of the old home.

Further details of aspects, objects and advantages of the disclosure are described below in the detailed description, drawings and claims. Both the foregoing general description and the following detailed description are exemplary and explanatory, and are not intended to be limiting as to the scope of the disclosure.

BRIEF DESCRIPTION OF FIGURES

The drawings illustrate the design and utility of some embodiments of the present disclosure. It should be noted that the figures are not drawn to scale and that elements of similar structures or functions are represented by like reference numerals throughout the figures. In order to better appreciate how to obtain the above-recited and other advantages and objects of various embodiments of the disclosure, a more detailed description of the present disclosure briefly described above will be rendered by reference to specific embodiments thereof, which are illustrated in the accompanying drawings. Understanding that these drawings depict only typical embodiments of the disclosure and are not therefore to be considered limiting of its scope.

The drawings use like reference numerals to identify like elements. A letter after a reference numeral, such as "120*a*," indicates that the text refers specifically to the element having that particular reference numeral. A reference numeral in the text without a following letter, such as "120," refers to any or all of the elements in the drawings bearing that reference numeral (e.g., "120" in the text refers to reference numerals "120*a*" and/or "120*b*" in the drawings). The disclosure will be described and explained with additional specificity and detail through the use of the accompanying drawings in which.

DETAILED DESCRIPTION

Various embodiments will now be described in detail, which are provided as illustrative examples of the disclosure so as to enable those skilled in the art to practice the disclosure. Notably, the figures and the examples below are not meant to limit the scope of the present disclosure. Where certain elements of the present disclosure may be partially or fully implemented using known components (or methods or processes), only those portions of such known components (or methods or processes) that are necessary for an understanding of the present disclosure will be described, and the detailed descriptions of other portions of such known components (or methods or processes) will be omitted so as not to obscure the disclosure. Further, various embodiments encompass present and future known equivalents to the components referred to herein by way of illustration.

Some of the terms used in this description are defined below for easy reference. The presented terms and their respective definitions are not rigidly restricted to these definitions—a term may be further defined by the term's use within this disclosure. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Some embodiments of the invention provide a new local rolling online patching solution to a database server with minimized disruption to other instances during patching. For a one-node database server, it achieves single rolling online patching by starting a new instance of the same database from the newly patched home before shutting down the co-located instance running out of the old home.

Figure 1A:
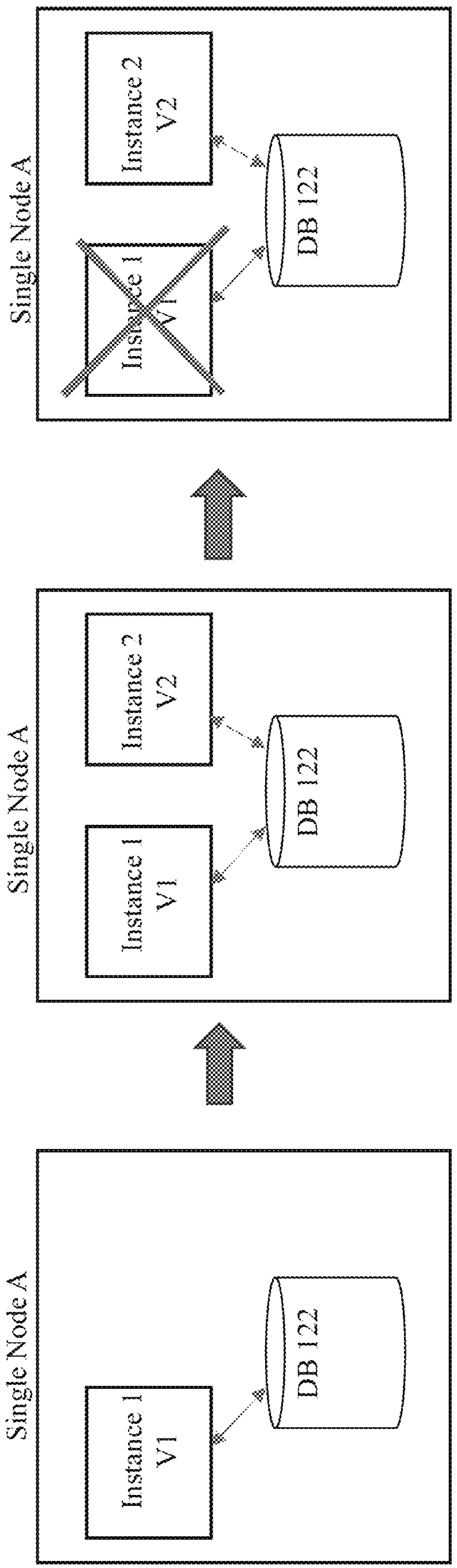
FIG. 1A shows an illustration of an embodiment of the invention that is operable to apply patches in a rolling fashion on a single node.

FIG. 1A shows an illustration of an embodiment of the invention that is operable to apply patches in a rolling fashion on a single node. Here, the left-hand portion of the figure shows a single Node A that includes a single Instance 1 on the node. The software at Instance 1 is currently at a state of version 1. The Instance 1 is operating in conjunction with a database (DB 122).

The database system may include one or more users or database applications within the system that operate from or using a user station to issue commands to be processed by database management system (DBMS) upon one or more database tables. The user stations and/or the servers that host or operate with the database system comprises any type of computing device that may be used to implement, operate, or interface with the database. Examples of such devices include, for example, workstations, personal computers, mobile devices, servers, hosts, nodes, or remote computing terminals. The user station comprises a display device, such as a display monitor, for displaying a user interface to users at the user station. The user station also comprises one or more input devices for the user to provide operational control over the activities of the system, such as a mouse or keyboard to manipulate a pointing object in a graphical user interface to generate user inputs. The database system may be communicatively coupled to the storage device (e.g., a storage subsystem or appliance) over a network. The storage device comprises any storage mechanism that may be employed by the database system to hold storage content, such as but not limited to a hard disk drive, SSD, persistent memory, storage array, network attached storage, etc.

Assume that the software underlying Instance 1 has undergone some sort of update or patch, and hence Instance 1 is now out-of-date. Ensuring that the database is running with the latest patches is very important for most users/customers. Many organizations prefer or need to do frequent patching operations in a way that allows them to minimize potential downtime for end users.

In a configuration having multiple nodes (rather than a single node as shown in FIG. 1A), then the solution to this problem is to simply perform a multi-node rolling upgrade, whereby one or more instances are shut down and their respective software is updated while other instances remain online and continue servicing client workload. This provides client servicing and accessibility to the database during the rolling upgrade since at least one of the nodes remains operational even while others are being upgraded.

However, if the organization uses a one-node cluster configuration as shown in FIG. 1A—which is a common configuration in cloud computing—then there is no conventional solution to perform online patching. If the database is configured on only one node, then conventional solutions typically require a shutdown of the database instance on the node, which would make the database completely unavailable before the database service is restarted from the newly patched database home software installation.

Embodiments of the invention provide for a single node rolling upgrade, where for a one-node database server, the single rolling online patching/upgrade is implemented by starting a new instance of the same database from the newly patched home before shutting down the previous instance running out of the old home. As shown in the middle portion of FIG. 1A, a new Instance 2 at version 2 is now started that is temporarily co-located with Instance 1 at the single node A. Once Instance 2 is fully operational and is configured to handle the work arriving at the node, then the Instance 1 at the previous version 1 of the software can now be stopped, as shown in the right-hand portion of the figure.

Figure 1B:
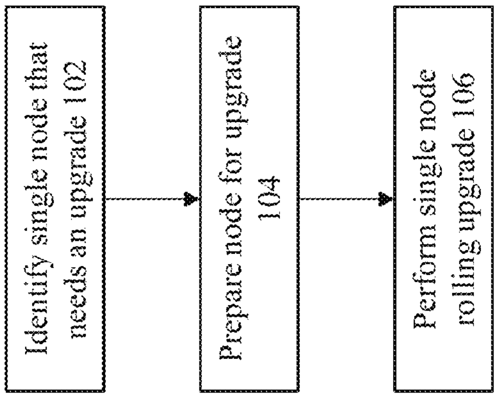
FIG. 1B shows a high-level flowchart of an approach to implement local rolling online patching/upgrade on a single node.

FIG. 1B shows a high-level flowchart of an approach to implement local rolling online patching/upgrade on a single node. At 102, a single node is identified that needs an upgrade and/or a patch. The single node corresponds to the single node in a one-node cluster configuration.

As previously noted, for a one-node database cluster, the single rolling online patching is implemented by starting a new instance of the same database from the newly patched home before shutting down the co-located instance running out of the old home. The basis of the ability to implement this type of single-node rolling upgrade is premised upon the fact that the node is configured as a server that runs a single-node clustered database system. For background explanation purposes, a typical clustered database environment includes a shared database and allows a single database to be run across multiple instances in order to improve or maximize availability and to enable horizontal scalability, while accessing shared storage. Each instance of the plurality of instances may correspond to one or more entities that perform database-related operations in the system. An entity may include a session as well as any other suitable processing entities. In a multi-node cluster, each of the database instances may reside on a separate host and forms its own set of background processes and memory buffers, but in which the cluster infrastructure allows access to a single shared database via multiple database instances. In a single node cluster, the instances may all reside on the same node.

With the current embodiments of the invention, the multiple co-located instances on the same Node A (Instance 1 and Instance 2) are operating as clustered DB instances that access the same database 122. This means that the semantics of the clustered DB system can be leveraged to permit the new instance to continue operating against the same database, despite the upgrade being performed on that single node. Specifically, at 104, the database-related and cluster-related objects, metadata, and/or operational-related functions are prepared for the upgrade. This involves activities such as obtaining the new patch/software, setting up the existing instance to be shut down, and to prepare for a handover of the database workload to the new instance that is to be created on the node for the DB cluster.

Thereafter at 106, the process to complete the single node rolling upgrade is actually implemented. This involves starting up the new instance at the new patch/software level, and then stopping the old instance.

Figure 2A:
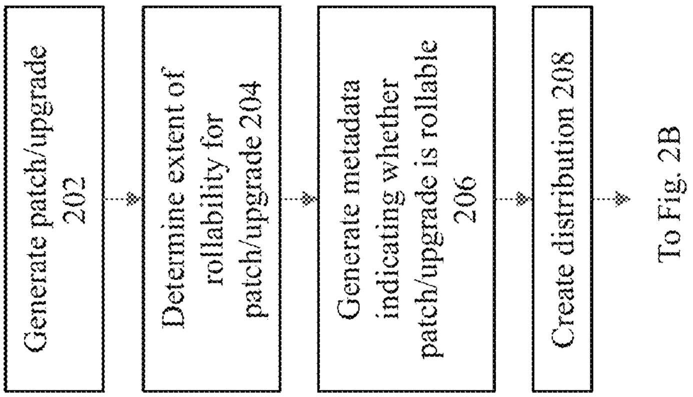
FIGS. 2A and 2B provide more detailed flowcharts of actions that are taken to implement the single-node rolling upgrade/patch process.
Figure 2B:
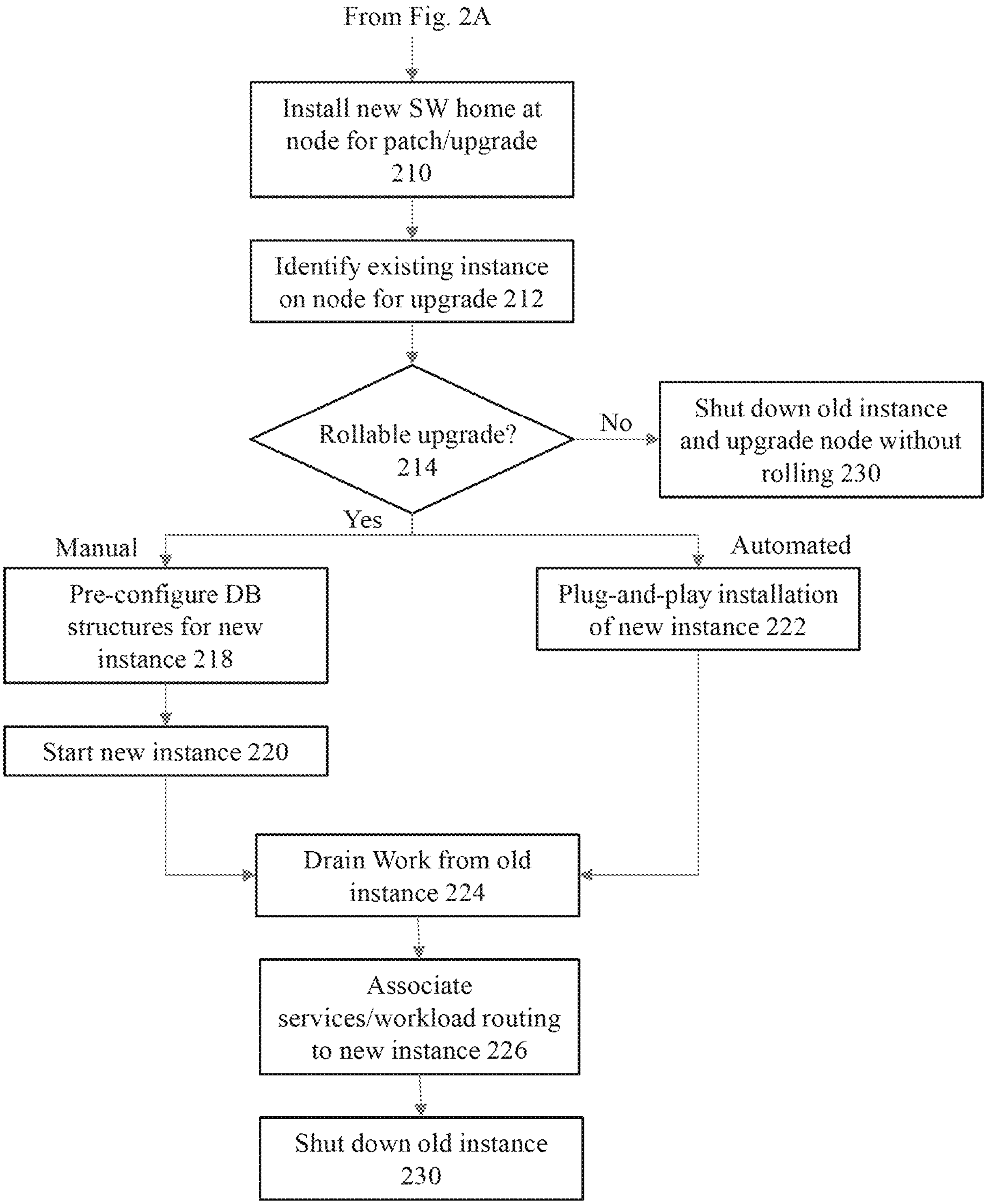

FIGS. 2A and 2B provide more detailed flowcharts of actions that are taken to implement the single-node rolling upgrade/patch process. FIG. 2A provides a description of set-up steps that are taken prior to the actual rolling upgrade/patch operation. FIG. 2B describes the sequence of steps to perform the rolling upgrade/patch.

At 202 of FIG. 2A, the patch/upgrade is generated. Software patches are used to implement any desired type of change to an item of software. In the case of patches for database software, the patch may relate to a change for database operation or functionality, e.g., to fix security vulnerabilities, improve performance, or add new features to the database. From an implementation perspective, this first involves identifying the changes that need to be made to the software program. This can be done by manually reviewing the code or by using a tool to identify differences between the current version of the software program and the desired version. Next, the process will generate a patch file that includes the changes to the software program. This can be done using a patch generation tool. The patch generation tool will create a patch file that contains the changes that need to be made to the software program in order to update it to the desired version.

Next, at 204, a determination is made of whether the changes made by the patch would affect the ability to perform a single node rolling upgrade. The reason for this step is that the changes made or affected by the patch/upgrade version of the software may be so extensive such that it is not possible to have both the old instance and the new instance be co-extensive on the same node. For example, the patch/upgrade may involve certain fundamental changes to the formatting and/or structure of data in the database or to certain operational characteristics in how that data is handled or accessed, where these changes make the old version and the new versions of the instances significantly incompatible with one another. In this situation, the patch/upgrade would not allow for the single node rolling upgrade to occur. On the other hand, minor changes implemented by a patch almost certainly would not create any incompatibilities, and hence should not block a single node rolling upgrade.

Any suitable approach can be taken to make the determination of step 204. For example, a manual approach can be taken whereby the developer that implements the patch would also make a human-based determination of the rollability of the patch. Alternatively, an automated approach can be taken to make this determination, e.g., based upon a set of rules or based upon a machine-learning-based approach. In some embodiments, a version upgrade (e.g., a change from one database version to another) would be considered non-rollable, whereas a patch within the same database version would be generally considered rollable, albeit subject to exceptions depending upon the extent of the changes implemented by the patch.

At 206, information is created to indicate whether the patch/upgrade would be considered rollable. In some embodiments, this information corresponds to metadata comprising one or more parameters that indicate a straightforward YES or NO condition for the advisability of the rolling upgrade. In other cases, the metadata would provide information that allows the node itself to make the determination. For example, assume that the patch corresponds to a version 3 of software, where rollability is permitted from version 2 but not from version 1. This information would be created, and each node can then use that information to make the determination based upon the current version-state of the instance on that node.

Thereafter, at 208, a distribution is created for the patch/upgrade. For example, a patch file is created, e.g., where the patch file includes a compressed, encrypted, and/or digitally signed version of the patch. The rollability information from step 206 may also be included as part of the distribution. The patch distribution can then be distributed to the node that needs to be updated for installation.

When it is time to actually perform the patch/upgrade, then the actions of FIG. 2B are performed. At 210, a new software home (e.g., a "DB home") is created corresponding to a location on the node that includes the patch distribution. To install the patch distribution, the patch distribution file(s) are normally run at the node. The patch installation process would then replace and/or supplement the existing software program files with the patched files.

At 212, the existing instance on the node is identified for the upgrade process. This is the currently-running instance on the node that is at the previous version of the DB software.

A determination is then made at 214 whether the upgrade can be made in a rolling manner. This determination can be based upon information provided by the developer of the patch, as previously discussed above. If the type or amount of the change implemented by the patch/upgrade is too extensive, then a determination can be made at 214 that the process should not be rollable. Therefore, at 230, the upgrade process may involve taking the instance/node offline to work from clients, and then implementing the upgrade before allowing the upgraded node/instance to back online.

However, if the determination at 214 is that the upgrade can be made in a rolling manner, then the process proceeds to begin preparing for the rolling upgrade and starting the new instance. Either a more-manual or a more-automated "plug-and-play" approach can be taken to start the new instance.

In order to start the second instance from new database home, various preparation actions need to be taken at the node. For example, per-instance objects, such as, redo objects and entities, undo objects, table space, etc. need to be created for the new instance. A manual approach can be taken at 218, where these objects are manually performed. For example, an administrator may manually execute the appropriate SQL statements/scripts to perform these types of preparation actions. Thereafter, at 220, the new instance may be started from the patched DB home.

Alternatively, plug-and-play technology may be used to automatically perform these set-up steps, where the SQL statements no longer need to be manually executed. With this approach in some embodiments, the new instance should be carefully named to implement the automated processing, since the instance numbering that is included as part of the instance name provides an indication to the database to perform the automated processing. New instances names can be generated with the format of "<instancename_prefix>_<instance_number>". The system gets the list of in-use instance numbers and maximum available instance number in order to choose the smallest unused instance number to construct the new instance name.

The system updates the resource profile with the new instance names. Also, the old instance names are kept with resource profile to be reused for the next new patching process. If the correct next sequence number for the instance name is used, then the database can be configured to recognize the situation where the required DB-related structures and objects need to be created for the new instance, and then perform the necessary actions to create those objects and entities.

Before stopping the existing instances from the old database home, at 224, some embodiments may optionally choose to "drain" database sessions to minimize the client's brownout from the upgrade process. Most database sessions should be transferred from the old instance to the co-located new instance started from the newly patched home as the new instance does not have any workload yet. This allows database clients to proactively migrate to other running instances of the database and avoid incurring any downtime and forced disconnects.

It is noted however that a number of different approaches can be taken to perform draining for the existing instance. For example, one approach is to configure response messages to a client so that the client will on its own connect to a different instance, e.g., for sessions that are targeted for removal from the instance. With the draining procedure, the instance can be configured to provide a "service unavailable" response message to the client when the client sends a service message to the instance, so that the client will know to move to another instance to get its workload handled. Another approach is to mark and allow planned failover to suicide a session itself where that session is ready to failover. The most aggressive approach is to simply kill the connection so that the client will be forced to connect to another instance. The last approach is likely to be the most invasive, since the application may see errors when failover cannot occur. The system may also implement a one-time session migration when possible. In some embodiments, the kill approach will not be used until the less aggressive drain and planned failover approaches have been given an opportunity to succeed. Further details regarding an example approach to implement draining and planned failovers is described in U.S. Patent Publication No. 2018/0129688, which is hereby incorporated by reference in its entirety.

At 226, actions are taken to associate the services provided to the clients to the new instance instead of the old instance. Various approaches can be taken to implement these actions. For example, as described above, draining may have already been performed to have clients connect to the new instance. In addition, one or more listeners may need to be configured. A listener is provided in the system to direct workload from clients to specific services within the database system. The new instance and the old instance may both correspond to the same service name or identifier, and the listener would be configured (e.g., in a routing table) to direct any new workloads to that service name to the new instance instead of the old instance.

Thereafter, at 230, the old instance can be shut down. By stopping the existing instances from the old database home in the above-described way, this form of patching can therefore be implemented to minimize the overhead and disruption to the client's database activities.

Figure 3A:
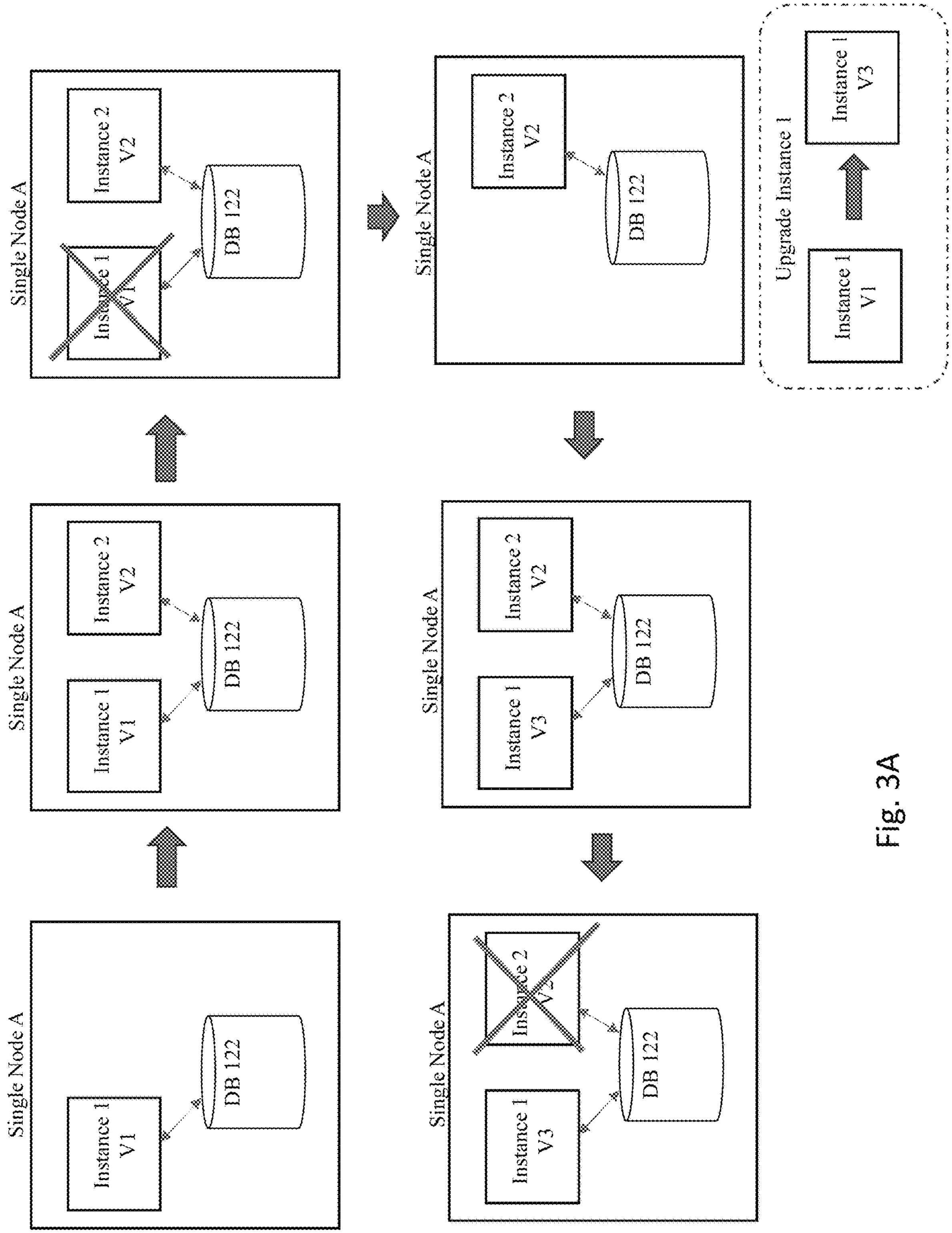
FIGS. 3A and 3B provide illustrations of additional embodiments of the invention.

FIG. 3A provides an illustration of another embodiment of the invention. In FIG. 3A, like the previous description of FIG. 1A, the top left portion of this figure shows a single Node A that at the beginning includes a single Instance 1 on the node where the software at Instance 1 was previously at a state of version 1. At some point, a single node rolling upgrade is performed, where as shown in the top middle portion of the figure, a new Instance 2 at version 2 is now started that is temporarily co-located with Instance 1 at the single node A. Once Instance 2 is fully operational and is configured to handle the work arriving at the node, then as shown in the top right portion, the Instance 1 at the previous version 1 of the software can now be stopped.

In addition, a second rolling upgrade process can then be performed to operate upon the previous old instance. In particular, assume that another patch/upgrade has been received for the node (version 3). As shown in the lower right-hand portion of the figure, Instance 1 can now be patched/upgraded to the new version 3. As shown in the lower middle portion of the figure, the two instances (Instance 1 and Instance 2) are now co-existing on the node, but Instance 1 is now at the higher version number compared to Instance 2. A draining process may be performed to drain work away from Instance 2 and back to Instance 1. Finally, as shown in the lower left portion of the figure, Instance 2 can now be stopped.

Figure 3B:
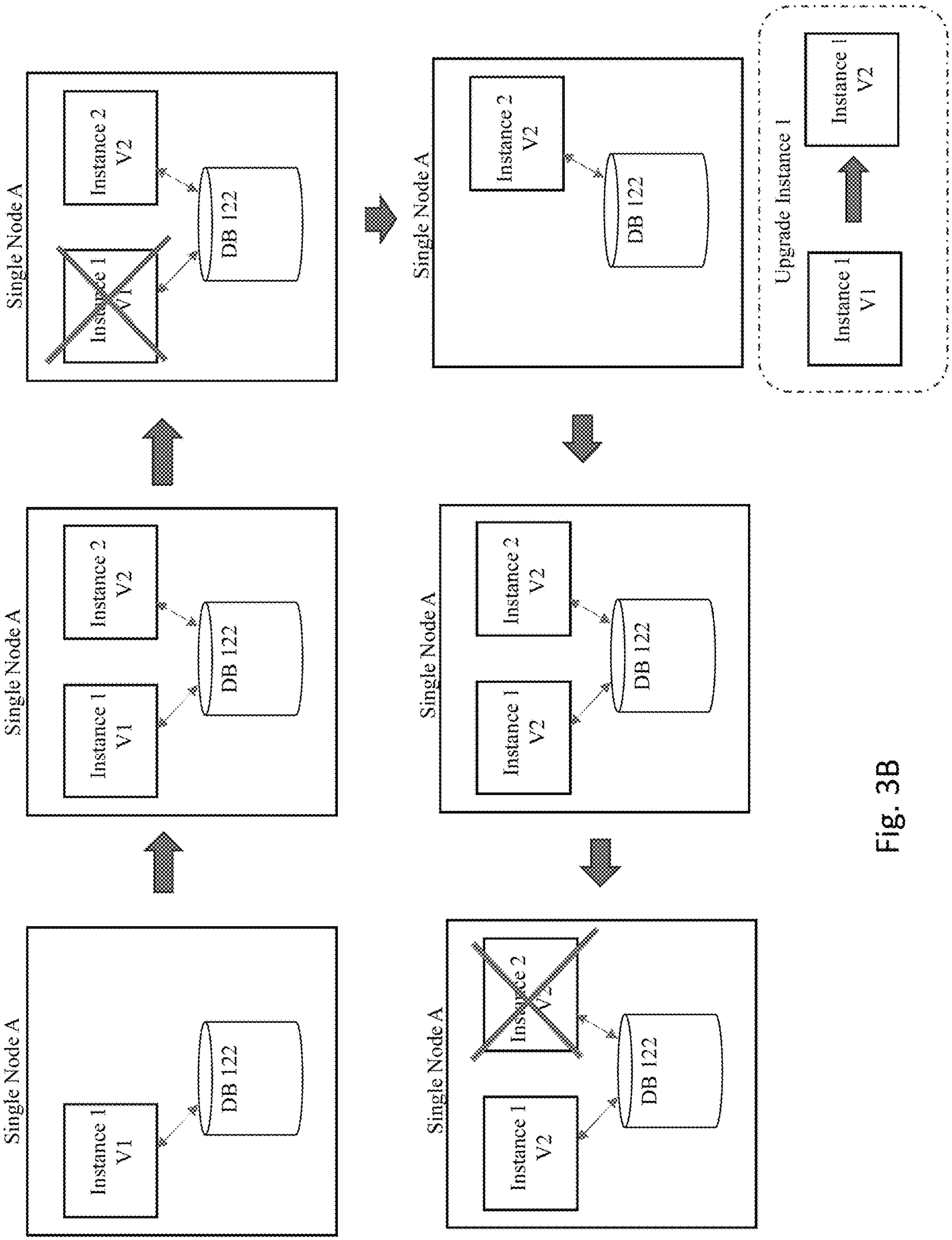

FIG. 3B provides and illustration of yet another embodiment of the invention. Like the previous descriptions, the top left portion of this figure shows a single Node A that at the beginning includes a single Instance 1 on the node where the software at Instance 1 was previously at a state of version 1. At some point, a single node rolling upgrade is performed, where as shown in the top middle portion of the figure, a new Instance 2 at version 2 is now started that is temporarily co-located with Instance 1 at the single node A. Once Instance 2 is fully operational and is configured to handle the work arriving at the node, then as shown in the top right portion, the Instance 1 at the previous version 1 of the software can now be stopped.

However, the embodiment of FIG. 3B performs a second rolling upgrade process to update Instance 1 to the same version as Instance 2 (unlike the approach of FIG. 3A which updates Instance 1 only if there is a newer version compared to Instance 2). As shown in the lower right-hand portion of the figure, Instance 1 can now be patched/upgraded to the version 2 of the software (same latest version as is running on Instance 2). As show in the lower middle portion of the figure, the two instances (Instance 1 and Instance 2) are now co-existing on the node, but both instances are now at the same version number. A draining process may be performed to drain work away from Instance 2 and back to Instance 1. Finally, as shown in the lower left portion of the figure, Instance 2 can now be stopped.

The question may be asked of the need to perform the additional rolling upgrade if Instance 1 will merely go the same version as the already-running Instance 2. The reason to implement this embodiment is because there may be certain affinities that are associated with Instance 1 that makes it more efficient to have Instance 1 running rather than Instance 2. For example, there may be scripts or programs that exist in the system which have been hard-coded with the name of the specific name/identifier for Instance 1, e.g., a script that perform backup processing. In this situation, it may be desirable to perform a chain of rolling upgrades, where the first leg of the rolling upgrade chain from Instance 1 to Instance 2 serves to generally minimize service interruptions, but the next leg of the rolling upgrade chain from Instance 2 back to Instance 1 serves to handle these special cases of hard-coded scripts or other affinities that have been developed on the node for Instance 1.

Figure 4A:
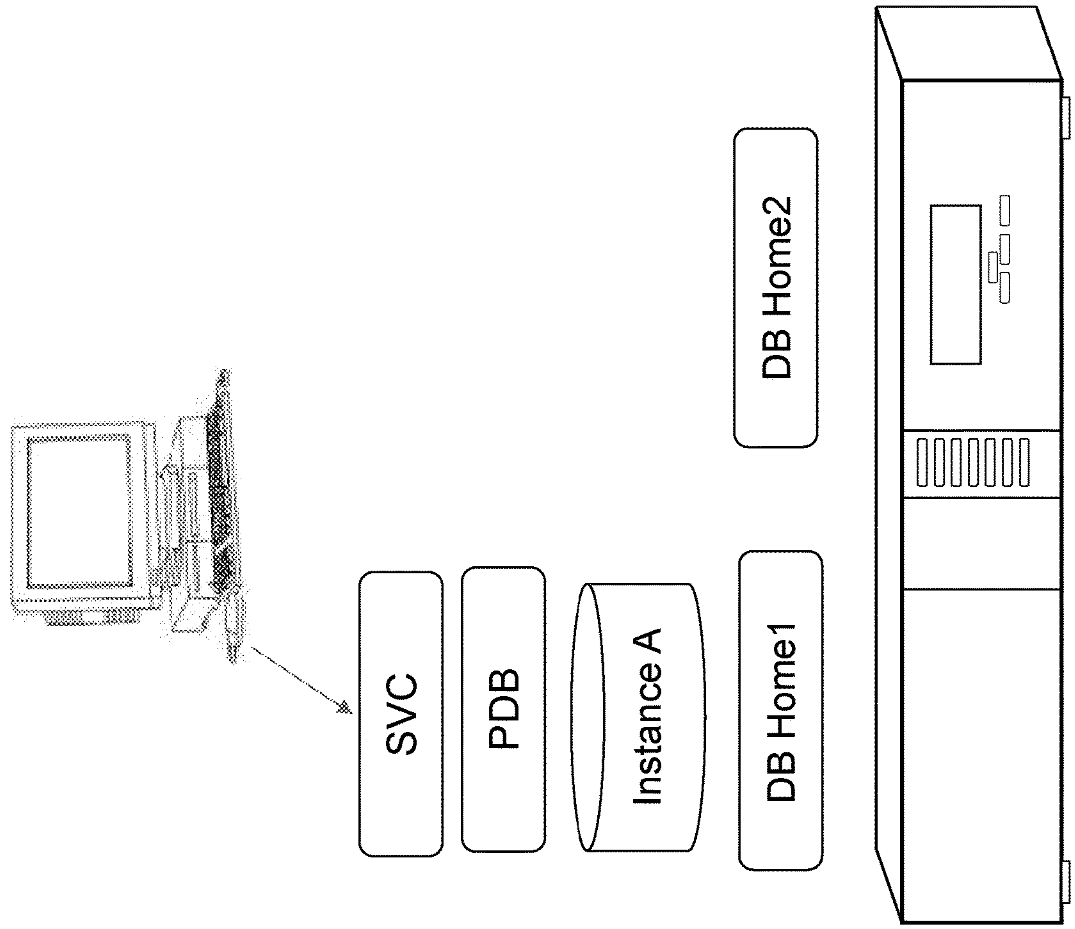
FIGS. 4A-D provide an illustration of a single-node rolling upgrade in the context of an example multi-tenant database.

One context in which the approach of implementing a single-node rolling upgrade is particularly useful is in the context of a multi-tenant database. FIGS. 4A-D provide an illustration of a single-node rolling upgrade in the context of an example multi-tenant database. In FIG. 4A, shown is a computing architecture that implements a multi-tenant database as a container database (CDB) system that provides a service (SVC) to a client. A CDB consolidates multiple pluggable databases (PDB), and implements a portable collection of schemas, schema objects, and non-schema objects. With this architecture, a base infrastructure is provided by the CDB as a platform to implement and host individual private databases. The private databases themselves would then be "plugged" into the CDB as individual databases for a tenant embodied as the PDBs. A container can be implemented as either a PDB or root, where the root container is a collection of schemas, schema objects, and non-schema objects to which the PDBs belong. The CDB includes a root, which stores metadata and common users. The CDB may also include a seed PDB, which is a system-supplied template that the CDB can use to create new PDBs. One or more user-created PDBs may also exist in the CDB, where the PDB corresponds to a user-created entity that contains the data and code required for a specific set of features. For example, a PDB can support a specific application, such as a human resources or sales application.

The advantage of this approach for a multi-tenant database is with regards to resource usage and database consolidation. Database consolidation is the process of consolidating data from multiple databases into one database on one computer. Using the multitenant architecture for database consolidation provides benefits for cost reduction, since by consolidating hardware and database infrastructure to a single set of background processes, and efficiently sharing computational and memory resources, this reduces costs for hardware and maintenance tasks/expenses. This also provides advantages for easier management and monitoring of the physical database, as well as efficiencies for performance tuning.

In the system of FIG. 4A, the existing Instance A is associated with a service SVC that handles workloads from the client for a given PDB. The instance A is currently operational for a version of the software installed at DBHome1.

Figure 4B:
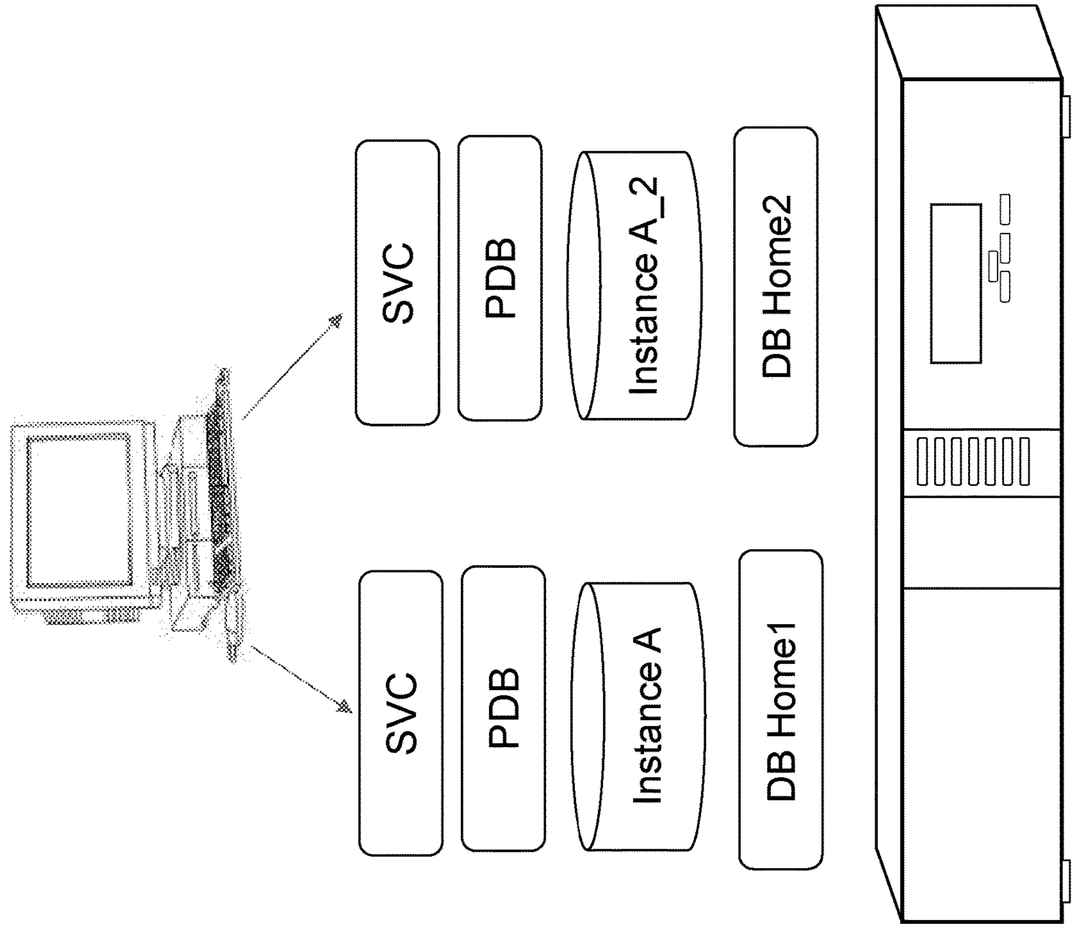

FIG. 4B shows the system after a new instance (Instance B) has been started from a new DB home (DM Home2). This figure shows the situation when the old instance (Instance A) has not yet been stopped, and thus both instances are currently still running. At this point, draining may occur to move any sessions currently active on Instance A to be Instance B. It is noted that the same SVC and PDB name may be associated with both instances. From the client perspective, since the same SVC and PDB names are being used, the client will not notice any difference in its operation. However, internally within the system, while work may theoretically be directed to either instance, it is preferable to configure the listener to direct any new workloads to Instance B instead of Instance A. Old workloads that have not yet been drained or migrated may still be directed to the old Instance A.

Figure 4C:
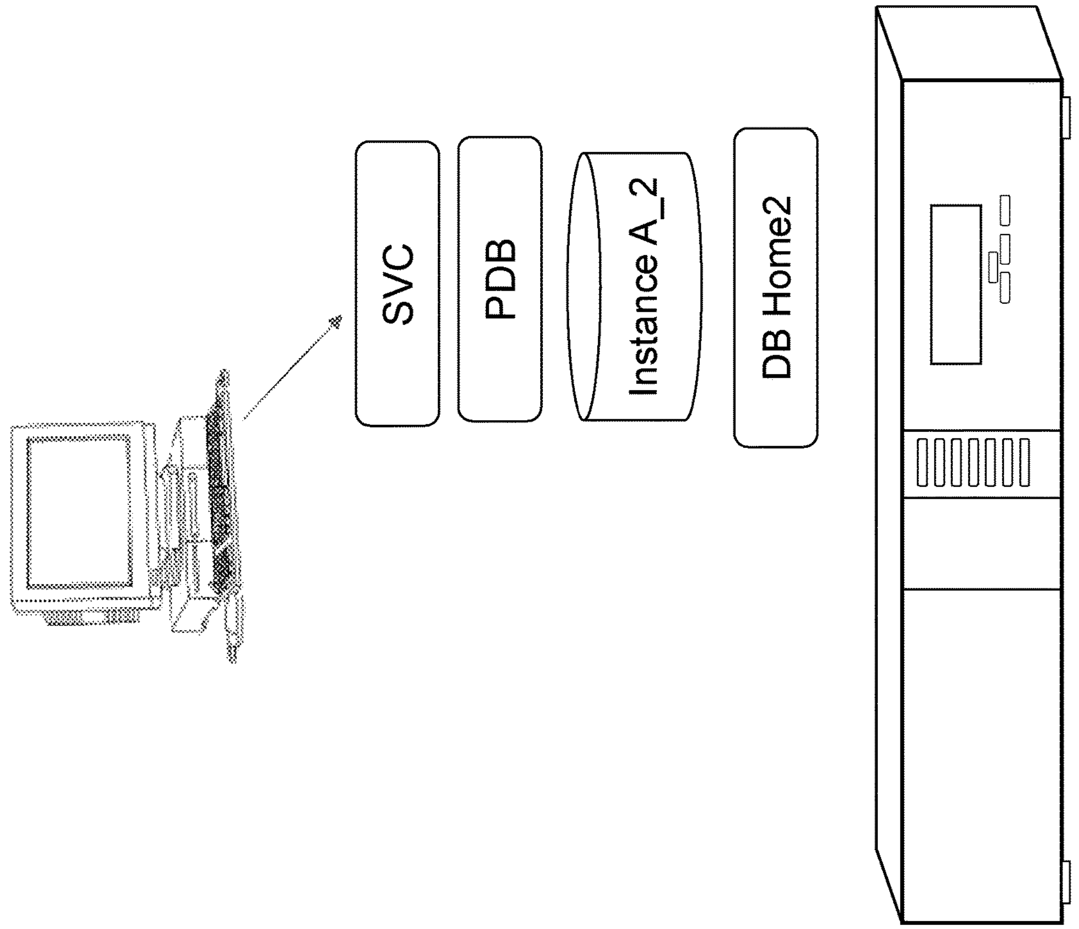

FIG. 4C shows the system after Instance A has been stopped. This step is performed after the draining process has been performed on Instance A. This action finishes the patching process by stopping the old unpatched instance DB Home 1.

Figure 4D:
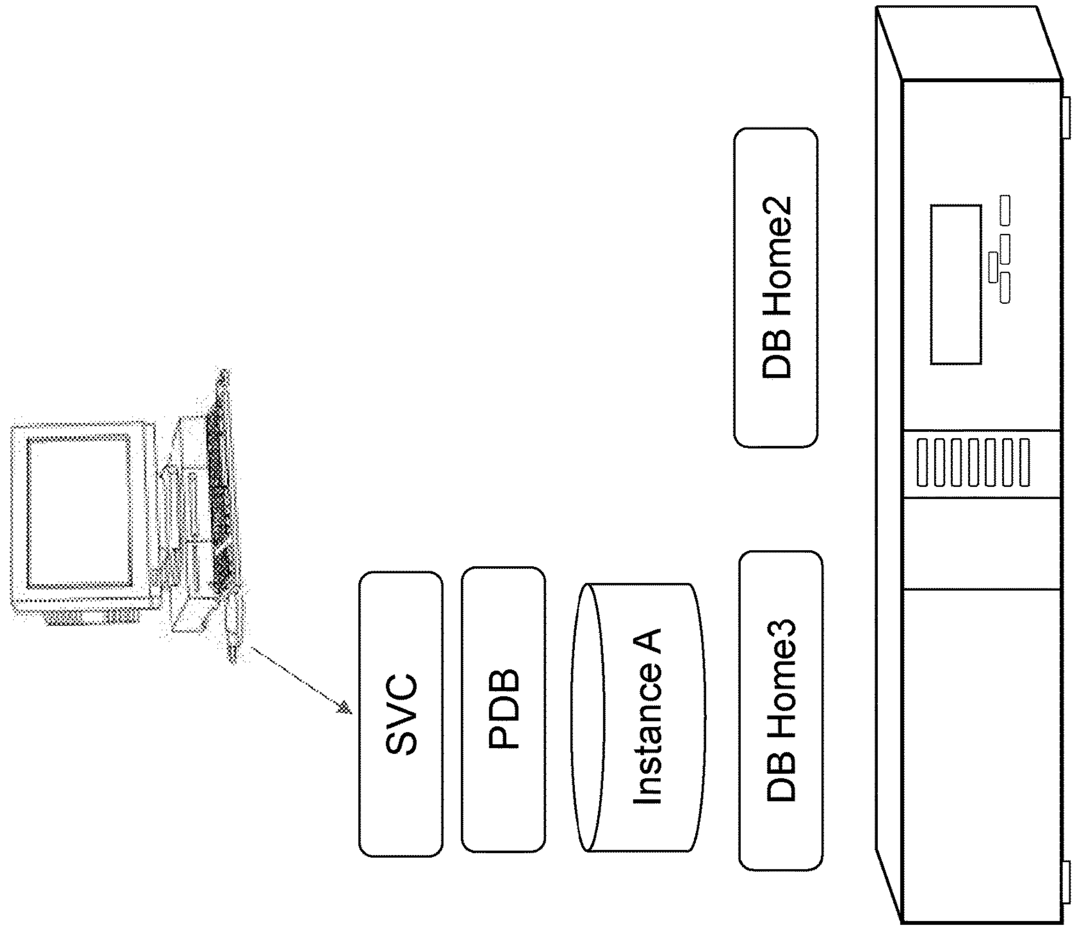

If additional patching is required, then as shown in FIG. 4D, another single-node rolling upgrade process may be performed to patch the software to install DM Home 3. The patching may re-use the old instance name for Instance A to the new patched DB home.

This approach therefore allows multiple instances of the database, pluggable databases, and services running on the same node during the new patching process from one instance from the old non-patched Database Home and another instance running from the new patched Database Home. The local rolling patching solution of some embodiments of the invention allows a new instance to be started on the same node from a patched new database home so that a database (e.g., a pluggable database and/or its services) are started before shutting down the old instance from the old database home that leverages the unique multi-node online patching solution available to a single node database server.

Therefore, what has been described is an improved approach to implement upgrades and patches for a single node cluster. When using the new solution, the distribution of connections can vary, especially if the procedure is performed on batches of instances, as reconnecting clients will be distributed to instances with fewer existing connections. But the workload is very likely to go to the new instance on the same node as it will be completely "unloaded" initially.

With some embodiments, the approach would be to first start the new database instance from the new home and the database service would be made available on the new instance. Immediately after that, the database service in the old instance will be stopped with a customer-specifiable drain timeout. As soon as either all sessions are terminated in the old instance or the drain timeout is reached, triggering forced session termination, the workload and the instance will be shut down. The same process will be performed on all nodes in parallel or sequentially where the database has running instances, at which point the patching process will complete and the database will return to running the configured number of instances.

This approach even provides significant advantages over the conventional multi-node rolling upgrade approach. With conventional multi-node rolling upgrades, before shutting down an instance of the database, the database service is made available on other instances on another node such that when there is the need to shut down a first instance for patching on a first node, all workload is relocated to a second instance on another node. However, this conventional approach is likely to overload the second instance and disrupt the existing workloads on the second instance. A more serious problem for the two-node configuration is that the second instance becomes a single point of failure when the first instance is shut down from the old home and before the first instance is restarted from the new home. The known solutions in industry are all premised upon this type of an out-of-place rolling patching that requires that the database be configured with at least two or more nodes in a cluster. Embodiments of the invention provide a solution to this problem. The local rolling patching solution of some embodiments of the invention allows a new instance to be started on the same node from a patched new database home so that a database (e.g., a pluggable database and/or its services) are started before shutting down the old instance from the old database home. This approach can even be applied across multiple nodes to address and solve the drawbacks described above for the conventional solutions. In this approach, each of the multiple nodes would individually perform a single-node rolling upgrade. Therefore, instead of a conventional multi-node rolling upgrade where in a configuration of n nodes, only n−1 nodes are running since at least 1 node is shut down while being upgraded, the current approach allow all n nodes to continue to be up and running during the upgrade process.

With some embodiments, the approach would be to first start the new database instance from the new home and the database service would be made available on the new instance. Immediately after that, the database service in the old instance will be stopped with a customer-specifiable drain timeout. As soon as either all sessions are terminated in the old instance or the drain timeout is reached, triggering forced session termination, the workload and the instance will be shut down. The same process will be performed on all nodes in parallel or sequentially where the database has running instances, at which point the patching process will complete and the database will return to running the configured number of instances.

The new approach provides numerous benefits. One benefit provided by the invention is that it allows for completely online DB home patching for a database running on a single compute node which is not achievable with any previous industry solutions. When the customers choose to deploy single-node clusters: rolling patching is impossible and patching a database means complete downtime. When using the new patching solution, the new instances are started before the old instances are shutdown so that the database continues to have High Availability and better client response time during the patching.

Another benefit provided by the invention is that the patching process minimized the disruption on other instances during patching for a multi-node database server. If the previous rolling approaches are utilized, the availability and workload capabilities of the database are decreased as it has fewer online instances during the patching time. For example, a typical 2-node clustered database will only have one instance online during patching, thus having its availability reduced to a single failure as well as only one instance to service the clients' requests that normally were serviced by two instances.

Yet another benefit provided by the invention is that all database instances in a cluster can be patched simultaneously so that the patching time will not be increased significantly if we add more nodes to a clustered database.

System Architecture Overview

Figure 5:
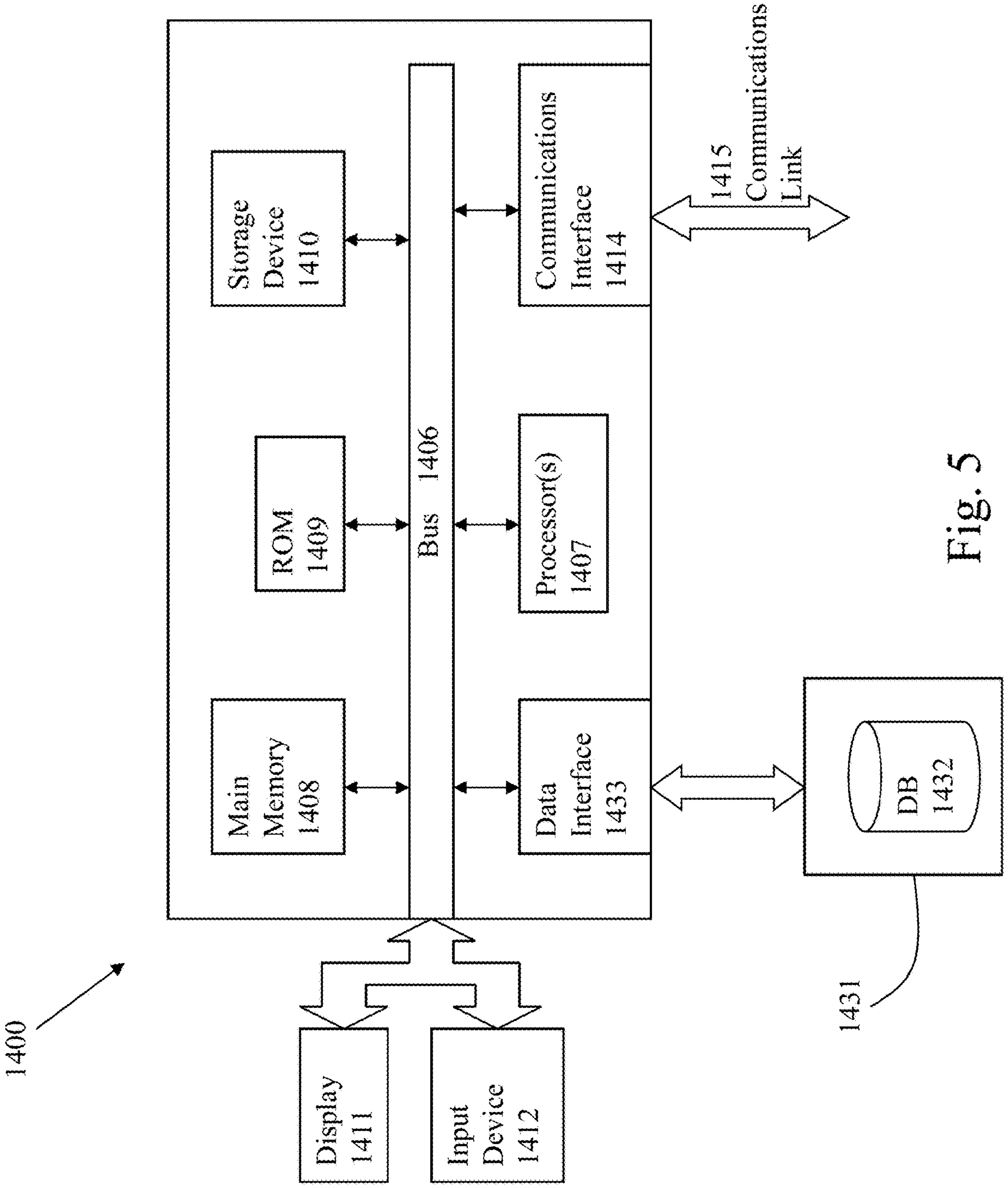
FIG. 5 illustrates a block diagram of an illustrative computing system suitable for implementing an embodiment of the present disclosure.

FIG. 5 is a block diagram of an illustrative computing system 1400 suitable for implementing an embodiment of the present disclosure. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), data interface 1433, and cursor control.

According to some embodiments of the disclosure, computer system 1400 performs specific operations by processor 1407 executing one or more sequences of one or more instructions contained in system memory 1408. Such instructions may be read into system memory 1408 from another non-transitory computer readable/usable medium, such as static storage device 1409 or disk drive 1410. In alternative embodiments, hard-wired circuitry may be used in place of or in combination with software instructions to implement the disclosure. Thus, embodiments of the disclosure are not limited to any specific combination of hardware circuitry and/or software. In some embodiments, the term "logic" shall mean any combination of software or hardware that is used to implement all or part of the disclosure.

The term non-transitory "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of non-transitory computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the disclosure, execution of the sequences of instructions to practice the disclosure is performed by a single computer system 1400. According to other embodiments of the disclosure, two or more computer systems 1400 coupled by communication link 1410 (e.g., LAN, PTSN, or wireless network) may perform the sequence of instructions required to practice the disclosure in coordination with one another.

Computer system 1400 may transmit and receive messages, data, and instructions, including program, e.g., application code, through communication link 1415 and communication interface 1414. Received program code may be executed by processor 1407 as it is received, and/or stored in disk drive 1410, or other non-volatile storage for later execution. A database 1432 in a storage medium 1431 may be used to store data accessible by the system 1400 via data interface 1433.

Figure 6:
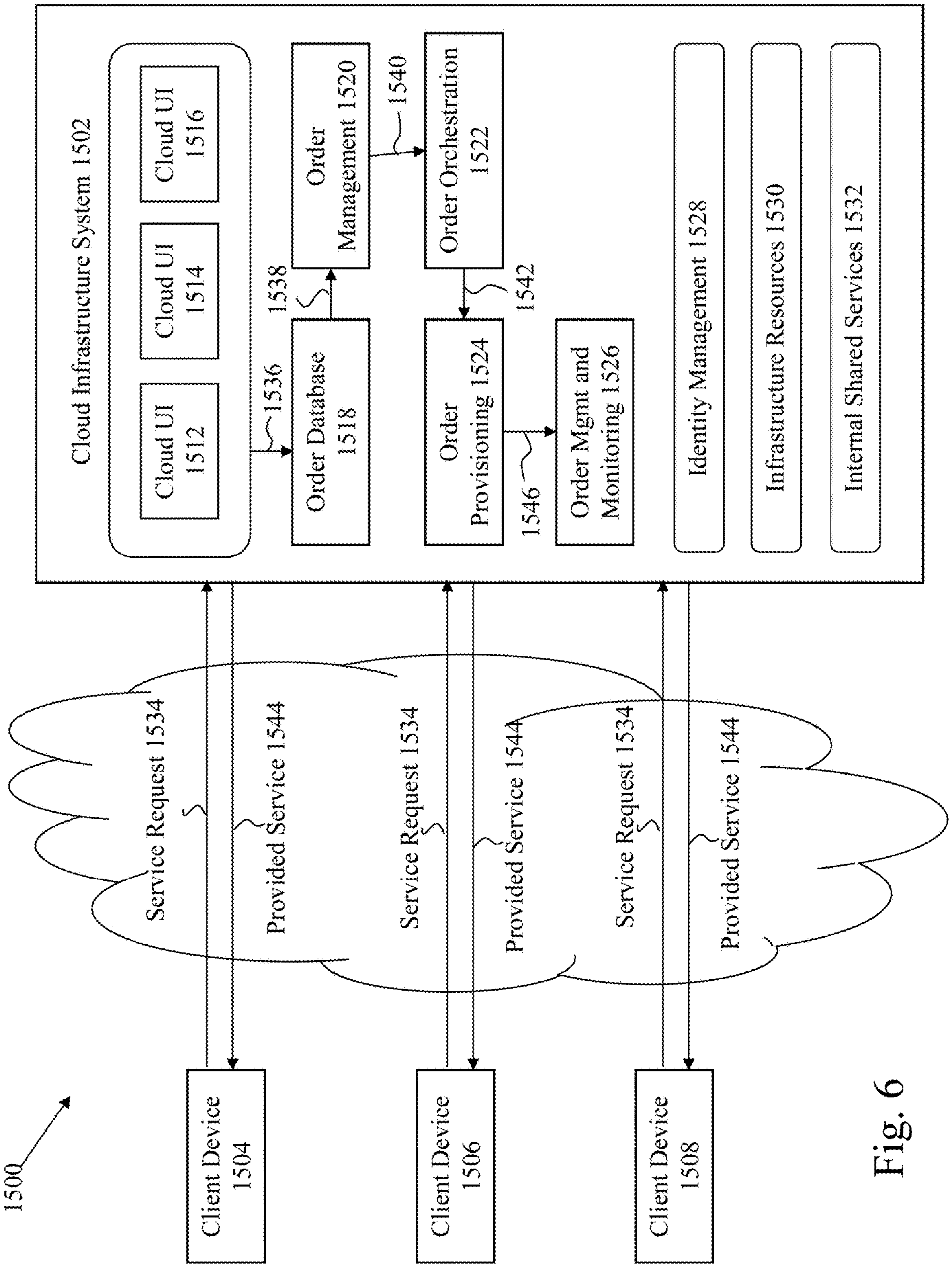
FIG. 6 illustrates a block diagram of one or more components of a system environment by which more efficient access to ordered sequences in a database environment is provided, in accordance with an embodiment of the present disclosure.

FIG. 6 is a simplified block diagram of one or more components of a system environment 1500 by which more efficient access to ordered sequences in a clustered database environment is provided, in accordance with an embodiment of the present disclosure. In the illustrated embodiment, system environment 1500 includes one or more client computing devices 1504, 1506, and 1508 that may be used by users to interact with a cloud infrastructure system 1502 that provides cloud services. The client computing devices may be configured to operate a client application such as a web browser, a proprietary client application, or some other application, which may be used by a user of the client computing device to interact with cloud infrastructure system 1502 to use services provided by cloud infrastructure system 1502.

It should be appreciated that cloud infrastructure system 1502 depicted in the figure may have other components than those depicted. Further, the embodiment shown in the figure is only one example of a cloud infrastructure system that may incorporate an embodiment of the disclosure. In some other embodiments, cloud infrastructure system 1502 may have more or fewer components than shown in the figure, may combine two or more components, or may have a different configuration or arrangement of components. Client computing devices 1504, 1506, and 1508 may be devices similar to those described. Although system environment 1500 is shown with three client computing devices, any number of client computing devices may be supported. Other devices such as devices with sensors, etc. may interact with cloud infrastructure system 1502.

Network(s) 1510 may facilitate communications and exchange of data between client computing devices 1504, 1506, and 1508 and cloud infrastructure system 1502. Each network may be any type of network familiar to those skilled in the art that can support data communications using any of a variety of commercially-available protocols. Cloud infrastructure system 1502 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1502 may include a suite of applications, middleware, and database service offerings that are delivered to a customer in a self-service, subscription-based, elastically scalable, reliable, highly available, and secure manner.

In various embodiments, cloud infrastructure system 1502 may be adapted to automatically provision, manage and track a customer's subscription to services offered by cloud infrastructure system 1502. Cloud infrastructure system 1502 may provide the cloud services via different deployment models. For example, services may be provided under a public cloud model in which cloud infrastructure system 1502 is owned by an organization selling cloud services and the services are made available to the general public or different industry enterprises. As another example, services may be provided under a private cloud model in which cloud infrastructure system 1502 is operated solely for a single organization and may provide services for one or more entities within the organization. The cloud services may also be provided under a community cloud model in which cloud infrastructure system 1502 and the services provided by cloud infrastructure system 1502 are shared by several organizations in a related community. The cloud services may also be provided under a hybrid cloud model, which is a combination of two or more different models.

In some embodiments, the services provided by cloud infrastructure system 1502 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1502. Cloud infrastructure system 1502 then performs processing to provide the services in the customer's subscription order.

In some embodiments, the services provided by cloud infrastructure system 1502 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that allow organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that allow organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1502 may also include infrastructure resources 1530 for providing the resources used to provide various services to customers of the cloud infrastructure system. In one embodiment, infrastructure resources 1530 may include pre-integrated and optimized combinations of hardware, such as servers, storage, and networking resources to execute the services provided by the PaaS platform and the SaaS platform.

In some embodiments, resources in cloud infrastructure system 1502 may be shared by multiple users and dynamically re-allocated per demand. Additionally, resources may be allocated to users in different time zones. For example, cloud infrastructure system 1530 may allow a first set of users in a first time zone to utilize resources of the cloud infrastructure system for a specified number of hours and then allow the re-allocation of the same resources to another set of users located in a different time zone, thereby maximizing the utilization of resources.

In certain embodiments, a number of internal shared services 1532 may be provided that are shared by different components or modules of cloud infrastructure system 1502 and by the services provided by cloud infrastructure system 1502. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1502 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1502, and the like.

In one embodiment, as depicted in the figure, cloud management functionality may be provided by one or more modules, such as an order management module 1520, an order orchestration module 1522, an order provisioning module 1524, an order management and monitoring module 1526, and an identity management module 1528. These modules may include or be provided using one or more computers and/or servers, which may be general purpose computers, specialized server computers, server farms, server clusters, or any other appropriate arrangement and/or combination.

In operation 1534, a customer using a client device, such as client computing devices 1504, 1506 or 1508, may interact with cloud infrastructure system 1502 by requesting one or more services provided by cloud infrastructure system 1502 and placing an order for a subscription for one or more services offered by cloud infrastructure system 1502. In certain embodiments, the customer may access a cloud User Interface (UI), cloud UI 1512, cloud UI 1514 and/or cloud UI 1516 and place a subscription order via these UIs. The order information received by cloud infrastructure system 1502 in response to the customer placing an order may include information identifying the customer and one or more services offered by the cloud infrastructure system 1502 that the customer intends to subscribe to.

After an order has been placed by the customer, the order information is received via the cloud UIs, 1512, 1514 and/or 1516. At operation 1536, the order is stored in order database 1518. Order database 1518 can be one of several databases operated by cloud infrastructure system 1502 and operated in conjunction with other system elements. At operation 1538, the order information is forwarded to an order management module 1520. In some instances, order management module 1520 may be configured to perform billing and accounting functions related to the order, such as verifying the order, and upon verification, booking the order. At operation 1540, information regarding the order is communicated to an order orchestration module 1522. Order orchestration module 1522 may utilize the order information to orchestrate the provisioning of services and resources for the order placed by the customer. In some instances, order orchestration module 1522 may orchestrate the provisioning of resources to support the subscribed services using the services of order provisioning module 1524.

In certain embodiments, order orchestration module 1522 allows the management of business processes associated with each order and applies business logic to determine whether an order should proceed to provisioning. At operation 1542, upon receiving an order for a new subscription, order orchestration module 1522 sends a request to order provisioning module 1524 to allocate resources and configure those resources needed to fulfill the subscription order. Order provisioning module 1524 allows the allocation of resources for the services ordered by the customer. Order provisioning module 1524 provides a level of abstraction between the cloud services provided by cloud infrastructure system 1502 and the physical implementation layer that is used to provision the resources for providing the requested services. Order orchestration module 1522 may thus be isolated from implementation details, such as whether or not services and resources are actually provisioned on the fly or pre-provisioned and only allocated/assigned upon request.

At operation 1544, once the services and resources are provisioned, a notification of the provided service may be sent to customers on client computing devices 1504, 1506 and/or 1508 by order provisioning module 1524 of cloud infrastructure system 1502.

At operation 1546, the customer's subscription order may be managed and tracked by an order management and monitoring module 1526. In some instances, order management and monitoring module 1526 may be configured to collect usage statistics for the services in the subscription order, such as the amount of storage used, the amount data transferred, the number of users, and the amount of system up time and system down time.

In certain embodiments, cloud infrastructure system 1502 may include an identity management module 1528. Identity management module 1528 may be configured to provide identity services, such as access management and authorization services in cloud infrastructure system 1502. In some embodiments, identity management module 1528 may control information about customers who wish to utilize the services provided by cloud infrastructure system 1502. Such information can include information that authenticates the identities of such customers and information that describes which actions those customers are authorized to perform relative to various system resources (e.g., files, directories, applications, communication ports, memory segments, etc.) Identity management module 1528 may also include the management of descriptive information about each customer and about how and by whom that descriptive information can be accessed and modified.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative rather than restrictive sense. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments.

What is claimed is:

1. A method, comprising:

identifying a single node that needs an upgrade;

preparing the single node for a single-node rolling upgrade; and performing the single-node rolling upgrade on the single node to upgrade a first or old instance on the single node to a second or new instance on the single node, wherein the first or old instance on the single node is shut down after the second or new instance starts executing on the single node such that the first or old instance and the second or new instance are temporarily co-located and executing on the single node.

2. The method of claim 1, wherein the upgrade is analyzed to determine whether the single node is eligible to undergo the single-node rolling upgrade.

3. The method of claim 1, wherein the single-node rolling upgrade is performed by identifying the first or old instance on the single node, applying a patch or upgrade to the single node, starting the second or new instance on the single node, and then shutting down the first or old instance on the single node after the second or new instance starts executing on the single node.

4. The method of claim 1, further comprising draining one or more sessions from the first or old instance to remove work from the first or old instance on the single node.

5. The method of claim 4, wherein draining is performed to move the work from the first or old instance to the second or new instance on the single node.

6. The method of claim 1, wherein the single node comprises a clustered database system, and a service (SVC) and a pluggable database (PDB) are both associated with first or old instance and the second or new instance on the single node during the single-node rolling upgrade.

7. The method of claim 1, wherein the single-node rolling upgrade is performed across multiple nodes.

8. A system, comprising:

a processor;

a memory storing programmable code; and wherein the programmable code includes instructions executable by the processor for identifying a single node that needs an upgrade; preparing the single node for a single-node rolling upgrade; and performing the single-node rolling upgrade on the single node to upgrade a first or old instance on the single node to a second or new instance on the single node, wherein the first or old instance on the single node is shut down after the second or new instance starts executing on the single node such that the first or old instance and the second or new instance are temporarily co-located and executing on the single node.

9. The system of claim 8, wherein the instructions further cause the upgrade to be analyzed to determine whether the single node is eligible to undergo the single-node rolling upgrade.

10. The system of claim 8, wherein the instructions further cause the single-node rolling upgrade to be performed by identifying the first or old instance on the single node, applying a patch or upgrade to the single node, starting the second or new instance on the single node, and then shutting down the first or old instance on the single node after the second or new instance starts executing on the single node.

11. The system of claim 8, wherein the instructions further cause draining one or more sessions from the first or old instance to remove work from the first or old instance on the single node.

12. The system of claim 8, wherein draining is performed to move the work from the first or old instance to the second or new instance on the single node.

13. The system of claim 8, wherein the single node comprises a clustered database system, and a service (SVC) and a pluggable database (PDB) are both associated with first or old instance and the second or new instance on the single node during the single-node rolling upgrade.

14. The system of claim 8, wherein the single-node rolling upgrade is performed across multiple nodes.

15. A computer program product embodied on a non-transitory computer readable medium, the non-transitory computer readable medium having stored thereon a sequence of instructions which, when executed by a processor, causes:

identifying a single node that needs an upgrade;

preparing the single node for a single-node rolling upgrade; and performing the single-node rolling upgrade on the single node to upgrade a first or old instance on the single node to a second or new instance on the single node, wherein the first or old instance on the single node is shut down after the second or new instance starts executing on the single node such that the first or old instance and the second or new instance are temporarily co-located and executing on the single node.

16. The computer program product of claim 15, wherein the sequence of instructions further causes the upgrade to be analyzed to determine whether the single node is eligible to undergo the single-node rolling upgrade.

17. The computer program product of claim 15, wherein the sequence of instructions further causes the single-node rolling upgrade to be performed by identifying the first or old instance on the single node, applying a patch or upgrade to the single node, starting the second or new instance on the single node, and then shutting down the old or existing instance on the single node after the second or new instance starts executing on the single node.

18. The computer program product of claim 15, wherein the sequence of instructions further causes draining one or more sessions from the first or old instance to remove work from the first or old instance on the single node.

19. The computer program product of claim 18, wherein draining is performed to move the work from the first or old instance to the second or new instance on the single node.

20. The computer program product of claim 15, wherein the single node comprises a clustered database system, and a service (SVC) and a pluggable database (PDB) are both associated with the first or old instance and a second or new instance on the single node during the single-node rolling upgrade.

21. The computer program product of claim 15, wherein the single-node rolling upgrade is performed across multiple nodes.

22. The method of claim 3, the first or old instance comprising a first version of a database executing on the single node and being shut down after the second or new instance comprising a second version of the database that upgrades the first version has started executing on the single node.

23. The method of claim 22, further comprising upgrading the previously shut down first instance to a third version of the database that upgrades the second instance comprising the second version of the database, wherein the second instance comprising the second version is shut down after the first instance comprising the third version starts executing on the single node such that the first instance comprising the third version and the second instance comprising the second version are temporarily co-located and executing on the single node with the first instance having a higher version number compared to the second instance.

24. The system of claim 10, the first or old instance comprising a first version of a database executing on the single node and being shut down after the second or new instance comprising a second version of the database that upgrades the first version has started executing on the single node.

25. The computer program product of claim 17, the first or old instance comprising a first version of a database executing on the single node and being shut down after the second or new instance comprising a second version of the database that upgrades the first version has started executing on the single node.

* * * * *